US011854149B2

(12) United States Patent
Newhouse et al.

(10) Patent No.: US 11,854,149 B2
(45) Date of Patent: Dec. 26, 2023

(54) TECHNIQUES FOR CAPTURING AND DISPLAYING PARTIAL MOTION IN VIRTUAL OR AUGMENTED REALITY SCENES

(71) Applicant: Dropbox, Inc., San Francisco, CA (US)

(72) Inventors: Benjamin Zeis Newhouse, San Francisco, CA (US); Terrence Edward McArdle, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 34 days.

(21) Appl. No.: 17/205,682

(22) Filed: Mar. 18, 2021

(65) Prior Publication Data

US 2021/0209857 A1    Jul. 8, 2021

Related U.S. Application Data

(63) Continuation of application No. 14/628,113, filed on Feb. 20, 2015, now Pat. No. 10,977,864.

(Continued)

(51) Int. Cl.
*G09G 5/00* (2006.01)
*G06T 19/00* (2011.01)
(Continued)

(52) U.S. Cl.
CPC ............ *G06T 19/006* (2013.01); *G06T 11/00* (2013.01); *G06T 15/20* (2013.01); *H04N 5/77* (2013.01); *G06T 2215/16* (2013.01)

(58) Field of Classification Search
CPC ....... G06T 19/006; G06T 19/00; G06F 3/011; G06F 3/012; G02B 27/017
(Continued)

(56) References Cited

U.S. PATENT DOCUMENTS 5,287,437 A    2/1994 Deering et al.
5,745,126 A    4/1998 Jain et al.
(Continued)

FOREIGN PATENT DOCUMENTS

WO    WO-2008107553 A2    9/2008

OTHER PUBLICATIONS

Non-Final Office Action from U.S. Appl. No. 17/138,562, dated Nov. 17, 2021, 7 pages.
(Continued)

*Primary Examiner* — Gordon G Liu
(74) *Attorney, Agent, or Firm* — Keller Preece PLLC

(57) ABSTRACT

The present disclosure relates to techniques for capturing and displaying partial motion in VAR scenes. VAR scenes can include a plurality of images combined and oriented over any suitable geometry. Although VAR scenes may provide an immersive view of a static scene, current systems do not generally support VAR scenes that include dynamic content (e.g., content that varies over time). Embodiments of the present invention can capture, generate, and/or share VAR scenes. This immersive, yet static, view of the VAR scene lacks dynamic content (e.g., content which varies over time). Embodiments of the present invention can efficiently add dynamic content to the VAR scene, allowing VAR scenes including dynamic content to be uploaded, shared, or otherwise transmitted without prohibitive resource requirements. Dynamic content can be captured by device and combined with a preexisting or simultaneously captured VAR scene, and the dynamic content may be played back upon selection.

20 Claims, 9 Drawing Sheets

Related U.S. Application Data

(60) Provisional application No. 61/942,970, filed on Feb. 21, 2014.

(51) Int. Cl.
    *G06T 15/20*            (2011.01)
    *G06T 11/00*            (2006.01)
    *H04N 5/77*             (2006.01)

(58) Field of Classification Search
    USPC ........................................................ 345/633
    See application file for complete search history.

(56) References Cited

U.S. PATENT DOCUMENTS

| | | | |
|---|---|---|---|
| 5,841,439 A | 11/1998 | Pose et al. | |
| 5,990,941 A | 11/1999 | Jackson et al. | |
| 6,226,669 B1 | 5/2001 | Huang et al. | |
| 6,389,179 B1 | 5/2002 | Katayama et al. | |
| 6,760,026 B2 | 7/2004 | Li et al. | |
| 7,133,068 B2 | 11/2006 | Fisher et al. | |
| 7,136,090 B1 | 11/2006 | McDuffie White et al. | |
| 7,224,326 B2 | 5/2007 | Sefton et al. | |
| 7,389,591 B2 | 6/2008 | Jaiswal et al. | |
| 7,424,218 B2 | 9/2008 | Baudisch et al. | |
| 7,499,586 B2 | 3/2009 | Agarwala et al. | |
| 7,564,469 B2 | 7/2009 | Cohen | |
| 7,688,346 B2 | 3/2010 | Richards et al. | |
| 8,041,574 B2 | 10/2011 | Yano et al. | |
| 8,144,232 B2 | 3/2012 | Larson et al. | |
| 8,154,634 B2 | 4/2012 | Fukumoto et al. | |
| 8,301,159 B2 | 10/2012 | Hamynen et al. | |
| 8,373,573 B2 | 2/2013 | Chou et al. | |
| 8,384,718 B2 | 2/2013 | Dahlke et al. | |
| 8,698,902 B2 | 4/2014 | Kawamoto et al. | |
| 8,730,156 B2 | 5/2014 | Weising et al. | |
| 8,907,983 B2 | 12/2014 | Mcardle et al. | |
| 8,953,022 B2 | 2/2015 | Mcardle et al. | |
| 9,017,163 B2 | 4/2015 | Newhouse et al. | |
| 9,041,743 B2 | 5/2015 | Mcardle et al. | |
| 9,070,219 B2 | 6/2015 | Mcardle et al. | |
| 9,118,970 B2 | 8/2015 | Newhouse et al. | |
| 9,223,408 B2 | 12/2015 | Mcardle et al. | |
| 9,271,025 B2 | 2/2016 | McArdle et al. | |
| 9,418,479 B1 | 8/2016 | Worley, III et al. | |
| 9,626,799 B2 | 4/2017 | Mcardle et al. | |
| 9,723,226 B2 | 8/2017 | Newhouse et al. | |
| 10,068,383 B2 | 9/2018 | McArdle et al. | |
| 10,769,852 B2 | 9/2020 | McArdle et al. | |
| 2001/0030693 A1 | 10/2001 | Fisher et al. | |
| 2002/0140666 A1 | 10/2002 | Bradski et al. | |
| 2002/0158873 A1 | 10/2002 | Williamson et al. | |
| 2003/0065668 A1 | 4/2003 | Sowizral et al. | |
| 2003/0174136 A1 | 9/2003 | Emberling et al. | |
| 2004/0027330 A1 | 2/2004 | Bradski et al. | |
| 2005/0219239 A1 | 10/2005 | Mashitani et al. | |
| 2005/0232507 A1 | 10/2005 | Zimmer et al. | |
| 2005/0286125 A1 | 12/2005 | Sundstrom et al. | |
| 2005/0289590 A1* | 12/2005 | Cheok ................... G06F 3/0346 |
| | | | 725/62 |
| 2006/0050140 A1 | 3/2006 | Shin et al. | |
| 2006/0082692 A1 | 4/2006 | Kamijima et al. | |
| 2006/0232665 A1 | 10/2006 | Schowengerdt et al. | |
| 2006/0239525 A1 | 10/2006 | Katayama et al. | |
| 2007/0025723 A1 | 2/2007 | Baudisch et al. | |
| 2007/0035562 A1 | 2/2007 | Azuma et al. | |
| 2007/0076016 A1 | 4/2007 | Agarwala et al. | |
| 2007/0103543 A1 | 5/2007 | Anderson et al. | |
| 2007/0168418 A1 | 7/2007 | Ratnakar et al. | |
| 2007/0236493 A1 | 10/2007 | Horiuchi et al. | |
| 2008/0042973 A1 | 2/2008 | Zhao et al. | |
| 2008/0071559 A1 | 3/2008 | Arrasvuori et al. | |
| 2008/0082692 A1 | 4/2008 | Yano et al. | |
| 2008/0094417 A1 | 4/2008 | Cohen et al. | |
| 2008/0194323 A1 | 8/2008 | Merkli et al. | |
| 2008/0266326 A1 | 10/2008 | Porwal et al. | |
| 2008/0280676 A1 | 11/2008 | Distanik et al. | |
| 2008/0292131 A1 | 11/2008 | Takemoto et al. | |
| 2008/0309508 A1 | 12/2008 | Harmon et al. | |
| 2008/0317376 A1 | 12/2008 | Kasperkiewicz | |
| 2008/0320422 A1 | 12/2008 | Cazeaux et al. | |
| 2009/0140887 A1 | 6/2009 | Breed et al. | |
| 2009/0237564 A1 | 9/2009 | Kikinis et al. | |
| 2009/0240431 A1 | 9/2009 | Chau et al. | |
| 2009/0244097 A1 | 10/2009 | Estevez et al. | |
| 2009/0284610 A1 | 11/2009 | Fukumoto et al. | |
| 2009/0292774 A1 | 11/2009 | Box et al. | |
| 2010/0001980 A1 | 1/2010 | Kim et al. | |
| 2010/0002122 A1 | 1/2010 | Larson et al. | |
| 2010/0007657 A1 | 1/2010 | Rurin et al. | |
| 2010/0066763 A1 | 3/2010 | Macdougall et al. | |
| 2010/0085356 A1 | 4/2010 | Nie et al. | |
| 2010/0092079 A1 | 4/2010 | Aller et al. | |
| 2010/0125816 A1 | 5/2010 | Bezos et al. | |
| 2010/0161658 A1 | 6/2010 | Hamynen et al. | |
| 2010/0169837 A1 | 7/2010 | Hyndman et al. | |
| 2010/0171758 A1 | 7/2010 | Maassel et al. | |
| 2010/0188397 A1 | 7/2010 | Tsai et al. | |
| 2010/0208033 A1 | 8/2010 | Edge et al. | |
| 2010/0214111 A1 | 8/2010 | Schuler et al. | |
| 2010/0228633 A1 | 9/2010 | Guimaraes et al. | |
| 2010/0287485 A1 | 11/2010 | Bertolami et al. | |
| 2011/0041060 A1 | 2/2011 | Chien et al. | |
| 2011/0069229 A1 | 3/2011 | Lord et al. | |
| 2011/0090252 A1 | 4/2011 | Yoon et al. | |
| 2011/0164116 A1 | 7/2011 | Gay et al. | |
| 2011/0201362 A1 | 8/2011 | Bregman-Amitai et al. | |
| 2011/0213861 A1 | 9/2011 | Fanelli et al. | |
| 2011/0216060 A1 | 9/2011 | Weising et al. | |
| 2011/0234631 A1 | 9/2011 | Kim et al. | |
| 2011/0242134 A1 | 10/2011 | Miller et al. | |
| 2011/0248987 A1 | 10/2011 | Mitchell et al. | |
| 2011/0273451 A1 | 11/2011 | Salemann et al. | |
| 2012/0026166 A1 | 2/2012 | Takeda et al. | |
| 2012/0086728 A1 | 4/2012 | Mcardle et al. | |
| 2012/0105440 A1 | 5/2012 | Lieberman et al. | |
| 2012/0105483 A1 | 5/2012 | Fedorovskaya et al. | |
| 2012/0113264 A1 | 5/2012 | Moshrefi et al. | |
| 2012/0194553 A1 | 8/2012 | Osterhout et al. | |
| 2012/0212405 A1 | 8/2012 | Newhouse et al. | |
| 2012/0214590 A1 | 8/2012 | Newhouse et al. | |
| 2012/0218306 A1 | 8/2012 | Mcardle et al. | |
| 2012/0236029 A1 | 9/2012 | Newhouse et al. | |
| 2012/0242656 A1 | 9/2012 | Mcardle et al. | |
| 2012/0242798 A1* | 9/2012 | Mcardle ........... H04N 21/41407 |
| | | | 348/46 |
| 2012/0246223 A1 | 9/2012 | Newhouse et al. | |
| 2013/0038609 A1 | 2/2013 | Tsai et al. | |
| 2013/0124326 A1* | 5/2013 | Huang ............... G06Q 30/0261 |
| | | | 345/633 |
| 2013/0215148 A1* | 8/2013 | Antonyuk ............ G06F 3/0425 |
| | | | 345/633 |
| 2014/0019166 A1 | 1/2014 | Swanson et al. | |
| 2014/0092135 A1 | 4/2014 | Mcardle et al. | |
| 2014/0098137 A1 | 4/2014 | Fein et al. | |
| 2015/0070347 A1 | 3/2015 | Hofmann et al. | |
| 2015/0097867 A1 | 4/2015 | Mcardle et al. | |
| 2015/0113581 A1 | 4/2015 | Mcardle et al. | |
| 2015/0201133 A1 | 7/2015 | Newhouse et al. | |
| 2015/0243085 A1 | 8/2015 | Newhouse et al. | |
| 2015/0356788 A1 | 12/2015 | Abe et al. | |
| 2016/0262608 A1 | 9/2016 | Krueger | |
| 2017/0010469 A1 | 1/2017 | Samec et al. | |
| 2017/0193709 A1 | 7/2017 | Mcardle et al. | |
| 2017/0366758 A1 | 12/2017 | Newhouse et al. | |

OTHER PUBLICATIONS

Notice of Allowance from U.S. Appl. No. 17/138,562, dated Mar. 4, 2022, 9 pages.

Non-Final Office Action from U.S. Appl. No. 17/014,965, dated Jul. 15, 2021, 20 pages.

(56) References Cited

OTHER PUBLICATIONS

Final Office Action from U.S. Appl. No. 17/014,965, dated Oct. 28, 2021, 26 pages.
Notice of Allowance from U.S. Appl. No. 17/014,965, dated Apr. 4, 2022, 2 pages.
Notice of Allowance from U.S. Appl. No. 17/014,965, dated Mar. 22, 2022, 9 pages.
Corrected Notice of Allowance for U.S. Appl. No. 14/582,017 dated Nov. 6, 2015, 4 pages.
Duckett J., "Beginning HTML, XHTML, CSS, and JavaScript®," Dec. 30, 2009, Wrox, p. 234.
Easypano Holdings Inc, "Panoweaver 6.00 User Manual," downloaded from http://web.archive.org/web/20090711113513/http://www.easypano.com/download/doc/pw600-manual.pdf with an archive.org verified date of Jul. 11, 2009, pp. 24-74.
Fauster L., et al., "Stereoscopic Techniques in Computer Graphics," 2007, 10 pages.
Hewlett Packard, "HP Photosmart R717 Digital Camera with HP Instant Share User's Manual," Copyright 2005 Hewlett-Packard Development Company, downloaded from http://h10032.www1.hp.com/ctg/Manuals/c00298985.pdf on May 3, 2013, pp. 50-54.
Hildenbrand J., "Yelp 2.0 brings Monocle and Checkins to its Android Client," located at http://www.androidcentral.com/yelp-20-brings-monocle-andcheckins-its-android-client, Jul. 5, 2010, 10 pages.
Hwang J., et al., "Hand-held Virtual Reality: A Feasibility Study," Proceedings of the ACM Symposium on Virtual Reality Software and Technology, ACM, 2006, pp. 356-363.
Kanbara M., et al., "A Stereoscopic Video See-through Augmented Reality System Based on Real-time Vision-based Registration," Virtual Reality, 2000 Proceedings IEEE, 2000, 8 pages.
"Motion Control Simulation Applet," available at http://ir.exp.sis.pitt.edu/res2/data/is/groups/, archived on Sep. 1, 2006, Retrieved from http://web.archive.org/web/20060901110520/ and http://ir.exp.sis.pitt.edu/res2/data/is/group5/ on Nov. 5, 2013, 7 pages.
Non-Final Office Action for U.S. Appl. No. 13/302,977 dated Aug. 14, 2014, 6 pages.
Non-Final Office Action for U.S. Appl. No. 13/302,977 dated May 15, 2013, 20 pages.
Non-Final Office Action for U.S. Appl. No. 14/211,786 dated Oct. 23, 2015, 24 pages.
Non-Final Office Action from U.S. Appl. No. 16/586,412, dated May 7, 2020, 7 pages.
Notice of Allowance from U.S. Appl. No. 14/628,113, dated Dec. 9, 2020, 9 pages.
Notice of Allowance from U.S. Appl. No. 16/586,412, dated Sep. 25, 2020, 9 pages.
Notice of Allowance for U.S. Appl. No. 13/269,231 dated Aug. 1, 2014, 13 pages.
Notice of Allowance for U.S. Appl. No. 13/302,964 dated Mar. 30, 2015, 8 pages.
Notice of Allowance for U.S. Appl. No. 13/302,977 dated Jan. 13, 2015, 6 pages.
Notice of Allowance for U.S. Appl. No. 13/302,977 dated May 5, 2014, 10 pages.
Notice of Allowance for U.S. Appl. No. 13/347,273 dated Oct. 20, 2014, 5 pages.
Notice of Allowance for U.S Application No. 13/410,176 dated Mar. 3, 2015, 5 pages.
Notice of Allowance for U.S. Appl. No. 13/411,347 dated May 19, 2015, 7 pages.
Notice of Allowance for U.S. Appl. No. 14/044,287 dated Dec. 6, 2016, 5 pages.
Notice of Allowance for U.S. Appl. No. 14/533,000 dated Aug. 12, 2015, 12 pages.
Notice of Allowance for U.S. Appl. No. 14/582,017 dated Oct. 14, 2015, 6 pages.
Notice of Allowance for U.S. Appl. No. 14/668,915 dated Mar. 21, 2017, 8 pages.
Notice of Allowance for U.S. Appl. No. 15/463,926 dated May 23, 2018, 8 pages.
Notice of Allowance for U.S. Appl. No. 15/640,858 dated Jun. 20, 2019, 9 pages.
Office Action for U.S. Appl. No. 15/640,858 dated Feb. 26, 2019, 12 pages.
Office Action for U.S. Appl. No. 13/269,231 dated Nov. 8, 2013, 34 pages.
Office Action for U.S. Appl. No. 13/302,964 dated Aug. 14, 2014, 12 pages.
Office Action for U.S. Appl. No. 13/302,964 dated Feb. 11, 2014, 17 pages.
Office Action for U.S. Appl. No. 13/302,964 dated Feb. 6, 2015, 19 pages.
Office Action for U.S. Appl. No. 13/302,964 dated Jun. 10, 2013, 26 pages.
Office Action for U.S. Appl. No. 13/347,273 dated Apr. 23, 2014, 13 pages.
Office Action for U.S. Appl. No. 13/410,176 dated Aug. 22, 2014, 13 pages.
Office Action for U.S. Appl. No. 13/410,176 dated Jun. 21, 2013, 15 pages.
Office Action for U.S. Appl. No. 13/410,176 dated Mar. 20, 2014, 19 pages.
Office Action for U.S. Appl. No. 13/411,347 dated Feb. 10, 2014, 13 pages.
Office Action for U.S. Appl. No. 13/411,347 dated Oct. 21, 2014, 14 pages.
Office Action for U.S. Appl. No. 14/044,287 dated Aug. 19, 2015, 21 pages.
Office Action for U.S. Appl. No. 14/044,287 dated Feb. 5, 2016, 16 pages.
Office Action for U.S. Appl. No. 14/044,287 dated Jun. 30, 2016, 15 pages.
Office Action for U.S. Appl. No. 14/211,786 dated Jan. 5, 2017, 30 pages.
Office Action for U.S. Appl. No. 14/211,786 dated Jun. 1, 2016, 29 pages.
Office Action for U.S. Appl. No. 14/211,786 dated May 3, 2017, 35 pages.
Office Action for U.S. Appl. No. 14/211,786 dated Jul. 17, 2019, 32 pages.
Office Action for U.S. Appl. No. 14/533,000 dated Jun. 11, 2015, 24 pages.
Office Action for U.S. Appl. No. 14/533,000 dated Mar. 5, 2015, 20 pages.
Office Action for U.S. Appl. No. 14/582,017 dated Jun. 19, 2015, 8 pages.
Office Action for U.S. Appl. No. 14/628,113 dated Apr. 13, 2017, 26 pages.
Office Action for U.S. Appl. No. 14/628,113 dated May 19, 2016, 28 pages.
Office Action for U.S. Appl. No. 14/628,113 dated May 31, 2018, 26 pages.
Office Action for U.S. Appl. No. 14/628,113 dated Oct. 18, 2017, 28 pages.
Office Action for U.S. Appl. No. 14/628,113 dated Sep. 23, 2016, 37 pages.
Office Action for U.S. Appl. No. 14/668,915 dated Sep. 29, 2016, 6 pages.
Office Action for U.S. Appl. No. 15/463,926 dated Oct. 6, 2017, 11 pages.
Office Action for U.S. Appl. No. 15/640,858 dated Aug. 16, 2018, 6 pages.
Parr B., "Easter Egg: Yelp is the iPhone's First Augmented Reality App," located at https://web.archive.org/web/20090829094113/http://mashable.com/2009/Aug. 2007/yelp-aug . . . , Aug. 27, 2009, 10 pages.
"Rotations and Euler angles," Archived on Apr. 6, 2008, retrieved from https://web.archive.org/web/20080406234538/http://www.easyspin.org/documentation/eulerangles.html on Nov. 5, 2013, 4 pages.

* cited by examiner

TECHNIQUES FOR CAPTURING AND DISPLAYING PARTIAL MOTION IN VIRTUAL OR AUGMENTED REALITY SCENES

CROSS-REFERENCES TO RELATED APPLICATION

This application is a continuation of U.S. patent application Ser. No. 14/628,113, filed on Feb. 20, 2015, which claims the benefit of and priority to U.S. Provisional Application No. 61/942,970, filed Feb. 21, 2014. Each of the aforementioned applications is hereby incorporated by reference in its entirety.

TECHNICAL FIELD

This invention relates generally to the virtual and augmented reality, and more specifically to techniques for capturing and displaying video content that changes temporally and potentially spatially in a highlighted portion of a virtual or augmented reality (VAR) scene.

BACKGROUND

With the gaining popularity of mobile phones and mobile/tablet computers, virtual and augmented reality applications are becoming more approachable by the general public. However, as augmented and virtual realities become more widely accepted, there are numerous challenges to create an interface understandable and navigable by a wide variety of users. It can be difficult represent the moving contents of a virtual or augmented reality (VAR) scene because typical lenses found in consumer devices do not have a field of view or other means of technology to simultaneously capture an entire scene and the moving content. Additionally, representing motion in a dynamic scene can be prohibitively expensive due to bandwidth constraints. Further, since a user cannot view an entire VAR scene at once on the screen, there is a need for an animated consumption of content in a VAR scene that is focused in such a way so that the user knows where to look and can consume the animated context in a linear fashion as the author intended. This invention provides such a new and useful method for capturing and displaying VAR scenes with motion.

SUMMARY

The present disclosure relates generally to techniques for capturing and displaying partial motion in virtual or augmented reality (VAR) scenes. VAR scenes can include a plurality of images combined and oriented over any suitable geometry, including for example a spherical image disposed substantially symmetrically about a nodal point. Although VAR scenes may provide an immersive view of a static scene, current systems do not generally support VAR scenes that include dynamic content (e.g., content that varies over time). Embodiments of the present invention can capture, generate, and/or share VAR scenes. This immersive, yet static, view of the VAR scene lacks dynamic content (e.g., content which varies over time). Embodiments of the present invention can efficiently add dynamic content to the VAR scene, allowing VAR scenes including dynamic content to be uploaded, shared, or otherwise transmitted without prohibitive resource requirements. Dynamic content can be captured by device and, as described further below, combined with a preexisting or simultaneously captured VAR scene.

In some embodiments, the dynamic content captured by the device can be combined with a VAR scene as video content which is incorporated with the VAR scene as a "highlight" that is perpendicular to the perspective of the user (e.g., tangent to a spherical VAR scene). A highlight can be any content that varies over the time domain and which represents a subset of the VAR scene. This can include a video that may or may not include depth information that can be layered on top of a 3D model or in perpendicular to the user's rays of projection to provide a "billboarding" effect which is one of a seamless experience without distortion in the context of a VAR scene represented by a spherical photograph. Any suitable content that varies over time and/or spatial domains can be used.

Certain embodiments relate to methods for capturing and displaying partial motion in virtual or augmented reality (VAR) scenes. A method can include capturing a first plurality of images associated with a virtual or augmented reality (VAR) scene and capturing a second plurality of images associated with a highlight of the VAR scene. Differential data can then be determined between the first plurality of images and the second plurality of images. Location and orientation data of a viewer device can be detected and the VAR scene can be rendered based on the location and orientation of the viewer device. The viewer device may receive a selection of the highlight and render the highlight within the VAR scene using the differential data.

Certain embodiments relate to services and systems for capturing and displaying partial motion in virtual or augmented reality (VAR) scenes. One example of a system can comprise a capture device and a viewer device in communication with a content management service. The content management service can store and facilitate the sharing of VAR scenes captured by a capture device with one or more viewer devices. In some embodiments, the capture device can be configured to capture a first plurality of images associated with a virtual or augmented reality (VAR) scene, capture a second plurality of images associated with a highlight of the VAR scene, and determine differential data between the first plurality of images and the second plurality of images. The viewer device can configured to detect location and orientation data of the viewer device, render the VAR scene based on the location and orientation of the viewer device, receive a selection of the highlight, and render the highlight within the VAR scene using the differential data.

The following detailed description together with the accompanying drawings will provide a better understanding of the nature and advantages of the present invention.

DETAILED DESCRIPTION

The present disclosure relates generally to techniques for capturing and displaying partial motion in virtual or augmented reality (VAR) scenes. VAR scenes can include a plurality of images combined and oriented over any suitable geometry, including for example a spherical image disposed substantially symmetrically about a nodal point. Although VAR scenes may provide an immersive view of a static scene, current systems do not generally support VAR scenes that include dynamic content (e.g., content that varies over time). Embodiments of the present invention can capture, generate, and/or share VAR scenes. This immersive, yet static, view of the VAR scene lacks dynamic content (e.g., content which varies over time). Embodiments of the present invention can efficiently add dynamic content to the VAR scene, allowing VAR scenes including dynamic content to be uploaded, shared, or otherwise transmitted without prohibitive resource requirements. Dynamic content can be captured by device and, as described further below, combined with a preexisting or simultaneously captured VAR scene.

In some embodiments, the dynamic content captured by the device can be combined with a VAR scene as video content which is incorporated with the VAR scene as a "highlight" that is perpendicular to the perspective of the user (e.g., tangent to a spherical VAR scene). A highlight can be any content that varies over the time domain and which represents a subset of the VAR scene. This can include a video that may or may not include depth information that can be layered on top of a 3D model or in perpendicular to the user's rays of projection to provide a "billboarding" effect which is one of a seamless experience without distortion in the context of a VAR scene represented by a spherical photograph. Any suitable content that varies over time and/or spatial domains can be used.

Figure 1:
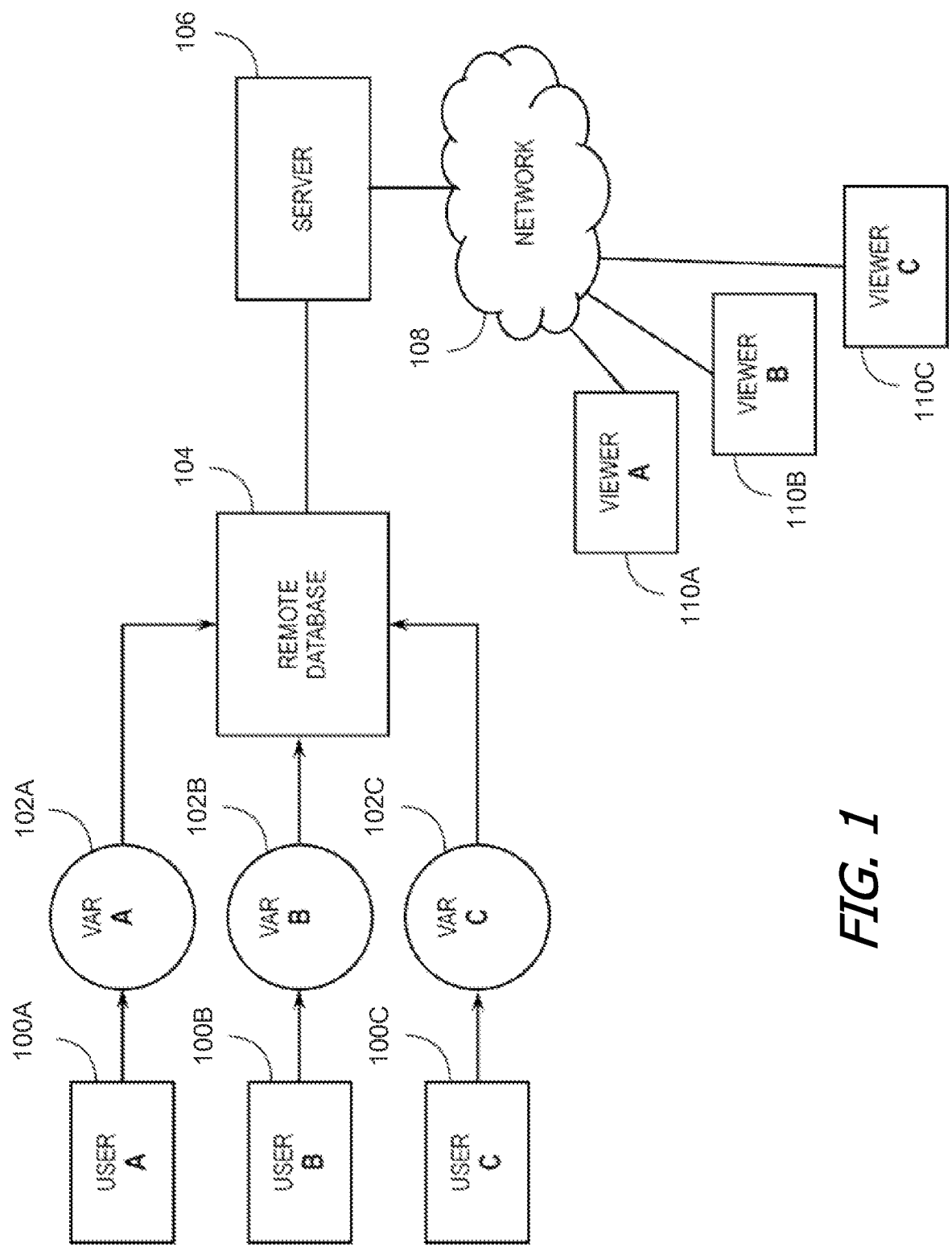
FIG. 1 shows a block diagram of a communication system, in accordance with an embodiment of the present invention.

FIG. 1 shows a block diagram of a communication system, in accordance with an embodiment of the present invention. As shown in FIG. 1, one or more user devices 100A, 100B, 100C, can be used to capture virtual or augmented reality (VAR) scenes 102A, 102B, 102C, and transmit and/or upload their respective VAR scenes 102A, 102B, 102C to a remote data store 104. The remote database 104 can be configured to include and/or be connected to a server 106 that is connectable to one or more viewer devices 110A, 110B, 110C through a network 108. In some embodiments, the server 106 can host one or more directories, files, and/or web pages containing and/or displaying the one or more VAR scenes 102A, 102B, 102C. In some embodiments, server 106 can be a server in an online content management service. The online content management service can include, for example, a file storage service, a file sharing service, a social media service that allows users to post messages and/or other content, and so on. Online content management service can communicate with one or more data stores. Online content management service can be hosted on servers maintained by a service provider and accessed via a network 108, such as the Internet. In some embodiments, online content management service can store content in one or more data sources (e.g., a database). The content can include audio, video, data, images, files, email messages, VAR scenes, and the like. In some embodiments, VAR scenes can be shared among users of the online content management service (e.g., VAR scenes from one or more capture devices 100A, 100B, 100C can be shared with one or more viewer devices 110A, 110B, 110C).

In some embodiments, a VAR scene can be generated by compositing a plurality of images captured by a capture device 100A, 100B, 100C. Compositing the plurality of images can include organizing and optionally optimizing the data for constructing a construct or data file for a spatial image scene. In some embodiments, the spatial scene can be designed for rendering with a 3D or 2D graphics platform such as OpenGL, WebGL, or Direct3D. The rendering can alternatively occur within a browser using HTML5 and/or CSS3 properties to apply appropriate transformations. In the HTML variation, HTML and CSS transforms can be used to render the VAR scene. As noted above, a VAR scene can be one that is optimally viewed with orientation/positioning parameters. For example, a viewer can explore a spherical spatial image scene on a mobile device by rotating and directing the mobile device in different directions. The displayed image on the mobile device can corresponds to the view a viewer would have seen during the capture of consecutive images. Additionally, pedometer sensing and/or GPS sensing can be used to navigate a spatial image that incorporates the user position such as walking along a path. In the HTML rendering variation, the device orientation/location/displacement is fetched (e.g., through HTML5 or a device API) and used to periodically update (e.g., 60 frames per second) the CSS transform properties of media of the virtual and augmented reality view. Exploring a spatial image scene can alternatively be achieved on a desktop or fixed device.

In some embodiments, compositing the plurality of images can occur on image capture device 100A, 100B, 100C, at remote database 104, and/or server 106. In some embodiments, the plurality of images can be stitched together using the ordering of the consecutive images and image processing to align the plurality of images. Additionally, orientation and/or location information that was collected at the image capture device while collecting the consecutive images can be used to spatially organize the images. Additionally, orientation and/or location information and image processing techniques can be cooperatively used to combine the consecutive images and assign the correct orientation to each of the plurality of images. For example, the at least two images can be stitched substantially from image processing techniques, but then assigned a global position based on a GPS signal and an orientation based on the orientation data (i.e., MEMS gyroscope, accelerometer, and the like) provided by the image capture device. In another variation of the method of an embodiment, audio and/or video data collected can additionally be mapped to particular areas of the spatial image scene. During viewing of the scene, the audio or video can be presented chronologically to show where the user was pointing while recording the media, or alternatively, presented when viewing a particular area.

In some embodiments, a user can be directed to maintain a substantially constant viewing distance between the user and the image capture device, which can function to regulate the manipulation of the image capture device during movement through the predetermined pattern. The viewing distance can be defined as the distance between the image capture device and the nodal point (e.g., the eyes of the user). The viewing distance can additionally be defined as the focal length. A substantially constant viewing distance can create a steady field of view during the traversal of the predetermined pattern and aids in the capture of a uniform scene of spatial imagery. An ideal viewing distance can additionally be standardized to be within a particular range such as between one and two feet between the image capture device and the nodal point.

In some embodiments, image capture device 100A, 100B, 100C, and methods of an embodiment can be embodied and/or implemented at least in part as a machine configured to receive a computer-readable medium storing computer-readable instructions. The instructions can be executed by computer-executable components can be integrated with device 100A, 100B, 100C, the remote database 104 and/or the server 106. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

Figure 2:
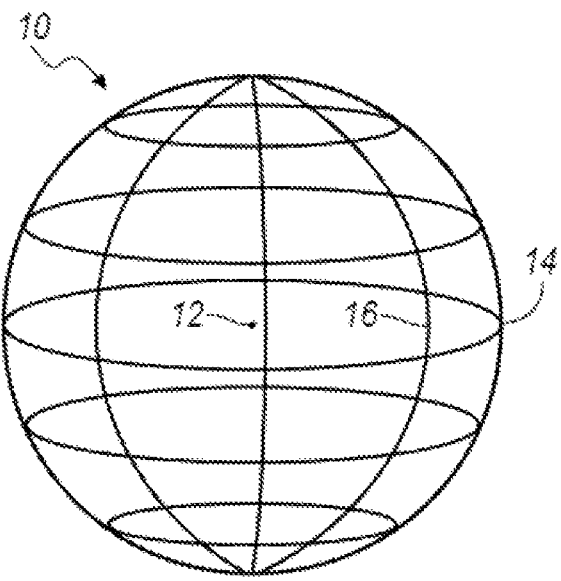
FIG. 2 shows an example of a spatial pattern used for capturing virtual or augmented reality (VAR) scenes, in accordance with an embodiment of the present invention.

FIG. 2 shows an example of a spatial pattern used for capturing virtual or augmented reality (VAR) scenes, in accordance with an embodiment of the present invention. Suitable spatial patterns can generally include multi-sided enclosed geometries and linear open geometries. As an example, the predetermined pattern can include a path, trail, map or other one-dimensional route through which the user is instructed to acquire substantially planar images. As shown in FIG. 2, one example spatial pattern can include a substantially spherical or spheroidal composite of images surrounding a nodal point 12. The spherical predetermined pattern 10 can function to permit a user and/or the image capture device to image an entire complete view of the space surrounding the nodal point 12. In some embodiments, the nodal point 12 is substantially coincident with a user, a user's head, or a portion of the user's head (i.e., a point between the user's eyes). Alternatively, the nodal point 12 can be substantially coincident with the image capture device. As shown, the spherical image 10 can define a series of latitudes 14 and a series of longitudes 16. In one variation of the method of an embodiment, the predetermined pattern can include identifying points on the spherical image 10 by latitude 14/longitude 16 coordinates at which an image should be acquired by the user. Alternatively, the predetermined pattern of an embodiment can include instructions to the user to scan a particular range of latitudes 14/longitudes 16 through each of a series of longitudes 16/latitudes 14. In some embodiments, if the predetermined pattern includes one or more images of a spherical image 10, then each of the individual images/frames can be acquired and/or processed as spherical images by the image capture device. Similarly, if the predetermined pattern includes a one-dimensional path, then each of the individual images/frames can be acquired and/or processed as planar images by the image capture device. Although embodiments are described herein with reference to a spherical pattern, other spatial patterns may also be used, such as a plane, cylinder, planar path, curved plane, or any suitable surface.

In some embodiments, a temporal pattern can be provided in addition, or as an alternative, to the spatial pattern described above. In some embodiments, the spatial pattern and/or temporal pattern can function to provide a user with a readily accessible and easily understood representation of the predetermined pattern for image acquisition. Example temporal patterns can include audible/visible cues (including musical cues) that follow a predetermined pattern indicating when and/or in what direction the user should acquire the next image/frame. In another variation of the method of an embodiment, the temporal pattern can include discrete intervals at which the user is signaled and/or instructed to capture the next image/frame in the VAR scene. Alternatively, the temporal pattern can include discrete intervals at which images/frames are automatically selected by the image capture device with or without notification to the user. As an example, if the image capture device includes a video camera, then the temporal pattern can include one or more discrete intervals that pace the acquisition of the series of frames in response to a predetermined timing, image capture device motion measurements, and/or image capture device input.

Figure 3:
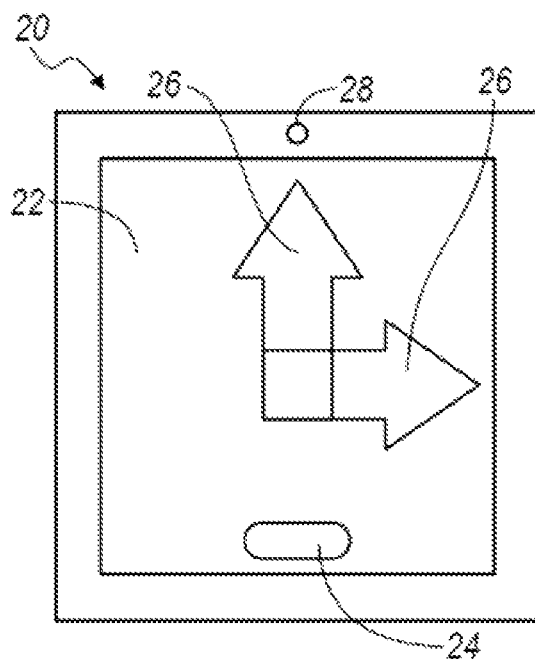
FIG. 3 shows a block diagram of a device, in accordance with an embodiment of the present invention.

FIG. 3 shows a block diagram of a device, in accordance with an embodiment of the present invention. As shown in FIG. 3, a predetermined pattern and/or user feedback in accordance with an embodiment can be presented to the user of device 20 (such as image capture device 100A, 100B, 100C) through one or more visual cues. The device 20 of an embodiment can include display 22, such as for example a touch screen display providing a user interface having one or more actuators 24, and front-facing camera 28. In the example embodiment described above, if the user is instructed to acquire images/frames composing spherical image 10, then device 20 can present a pattern/feedback through visual cues, such as arrows 26 that direct the user to move device 22 in a predetermined direction. In some embodiments, device 20 can use front facing camera 28 to determine a position of the user and/or nodal point 12, as well as to determine a proper focal/imaging distance between the user and device 20. As noted above, acquisition of spherical image 10 can include a rotation of device 20 through a range of latitudes 14 (along longitudinal arrow 26) followed by a change in longitudes 16 (i.e., pivot the device in the direction of latitudinal arrow 26).

Device 20 can include a camera, a video camera, a laptop computer, a tablet computer, a smart phone, or any other handheld or mobile device configured to acquire photos or videos. In some embodiments, device 20 can include at least one feedback channel for presenting the predetermined pattern to the user, such as for example display 22 or audio output that provides the user with the predetermined pattern and/or ongoing feedback for image acquisition. Additionally, the image capture device can include one or more embedded feedback controllers to internally control the image acquisition process in response to the orientation and/or location of the device.

Figure 4:
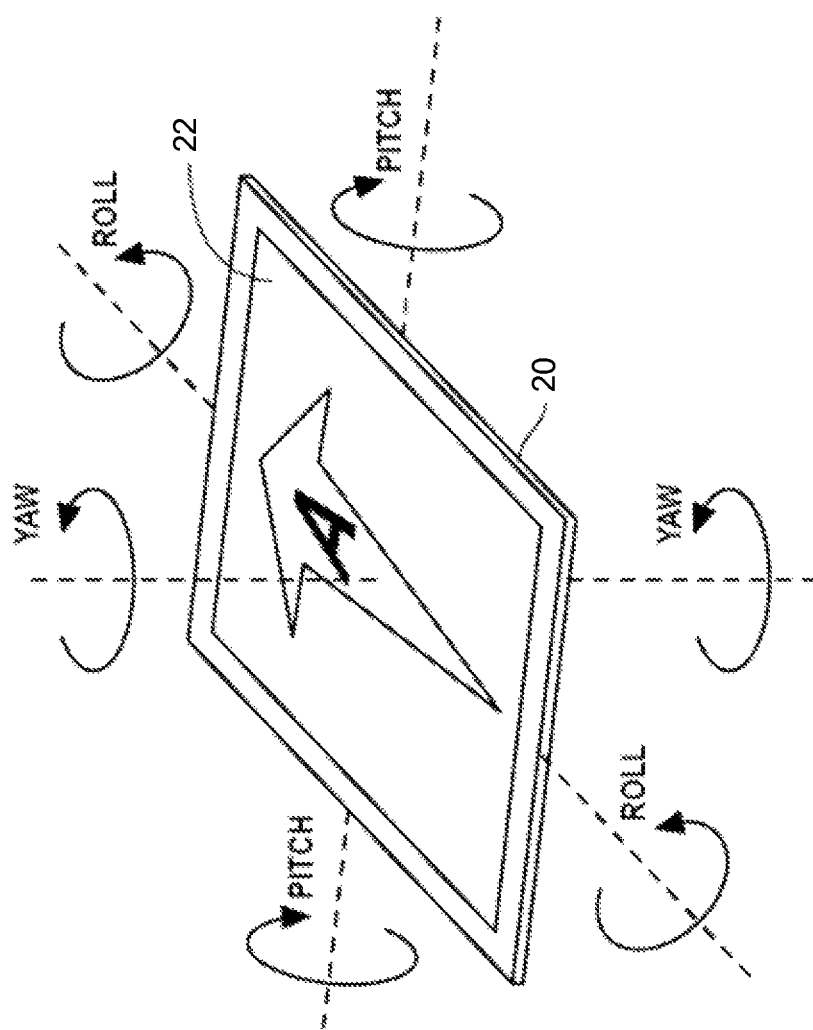
FIG. 4 shows examples of device orientations, in accordance with an embodiment of the present invention.

FIG. 4 shows examples of device orientations, in accordance with an embodiment of the present invention. As shown in FIG. 4, device 20 can be generally handled and/or oriented in three-dimensions. In some embodiments, device 20 can have a directionality conveyed by arrow A such that device 20 defines a "top" and "bottom" relative to a user holding device 20. As shown, device 20 of an embodiment can operate in a three-dimensional environment within which the apparatus can be rotated through three-degrees of freedom. In some embodiments, device 20 can be rotated about the direction of arrow A wherein the first degree of rotation is a roll value. Similarly, device 20 of an embodiment can be rotated in a first direction substantially perpendicular to the arrow A wherein the second degree of rotation is a pitch value. Further, device 20 of an embodiment can be rotated in a second direction substantially mutually orthogonal to the roll and pitch plane, wherein the third degree of rotation is a yaw value. The orientation of device 20 of an embodiment can be at least partially determined by a combination of its roll, pitch, and yaw values.

In some embodiments, device 20 can be configured to determine its own orientation in three-dimensional space. For example, device 20 can include one or more modules or sensors for detecting, determining, calculating, and/or providing a projection matrix, which is a mathematical representation of an arbitrary orientation of a three-dimensional object having three degrees of freedom relative to a second frame of reference. As an example, the projection matrix can include a mathematical representation of a device's orientation in terms of its Euler angles (pitch, roll, yaw) in any suitable coordinate system. In some embodiments, the image capture device can include one or more cameras (front/rear), an accelerometer, a gyroscope, a MEMS gyroscope, a magnetometer, a pedometer, a proximity sensor, an infrared sensor, an ultrasound sensor, a global position satellite transceiver, WiFi transceiver, mobile telephone components, and/or any suitable combination thereof for calculating the projection matrix and/or the associated Euler angles. Orientation and/or position information can be gathered in any suitable fashion, including device Application Programming Interfaces (API) or through any suitable API exposing device information, e.g., using HTML5 to expose device information including orientation/location.

Figure 5:
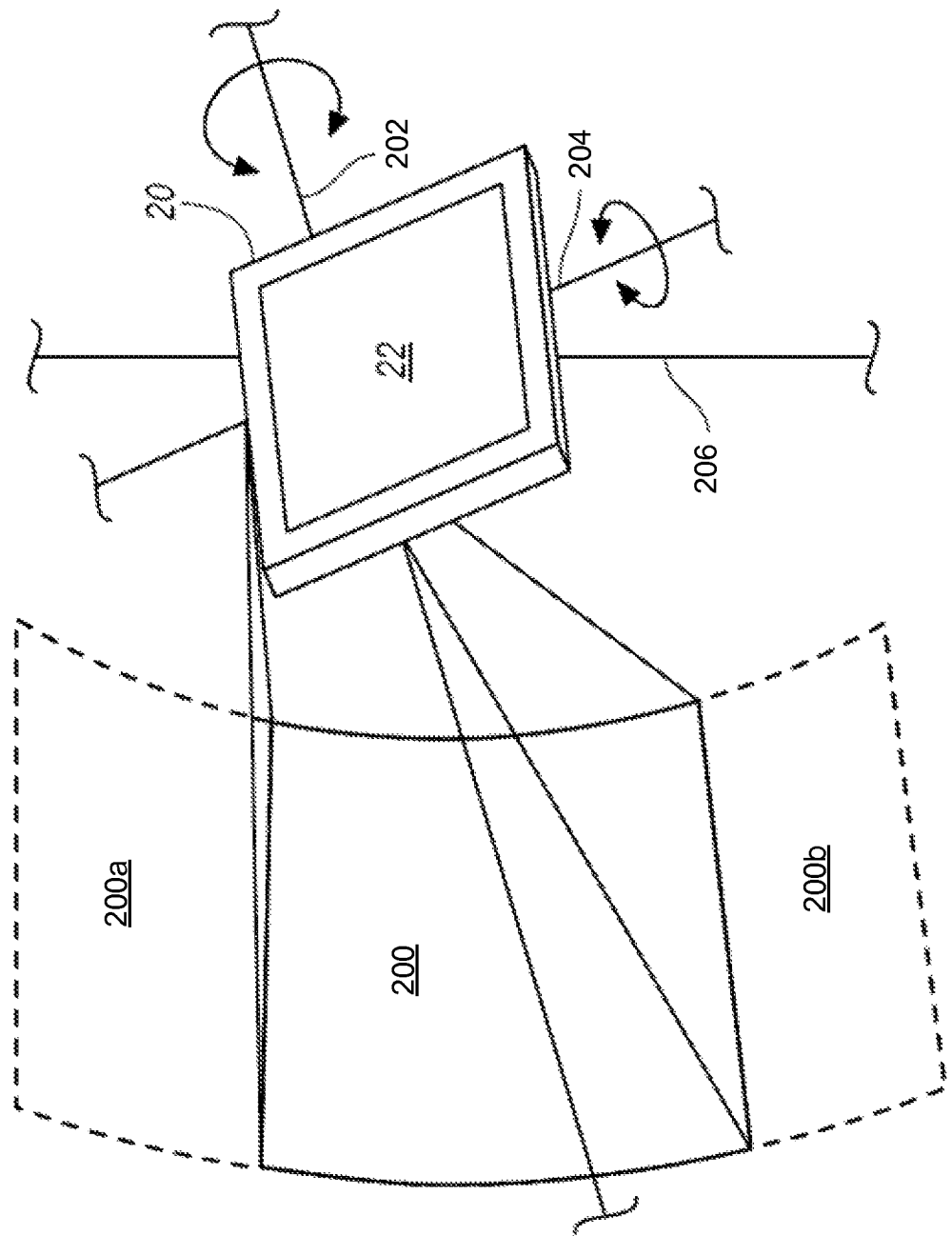
FIG. 5 shows an example of capturing a VAR scene using a predetermined pattern, in accordance with an embodiment of the present invention.

FIG. 5 shows an example of capturing a VAR scene using a predetermined pattern, in accordance with an embodiment of the present invention. As shown in FIG. 5, the predetermined pattern of the method of an embodiment can include instructions for orienting device 20 about one or more discrete axes 202, 204, 206. In some embodiments, the instructions can be presented to the user through display 22 of device 20, although other suitable tactile and/or audio instructions can be communicated in addition to or in lieu of visible instructions. As shown in FIG. 5, device 20 can be rotated through a series of pitch values about axis 202 to capture a series of discrete images/frames 200, 200A, 200B. In some embodiments, device 20 can additionally and/or subsequently be rotated through a series of roll values along axis 206 for each series of images/frames captured 200, 200A, 200B. Acquisition of a sufficient range of pitch values and roll values can result in the collection of an entire spherical image 10 of the type described above. Alternatively, if device 20 is equipped with front-facing and rear-facing cameras, then the sufficient range of pitch values and roll values can be divided in half, as device 20 can capture opposing segments of hemispherical images at each acquisition. In another variation of the method of an embodiment, the front-facing and rear-facing cameras can be configured with customized settings (i.e., exposure settings) such that each camera functions to supplement the other resulting in additional image data being collected for each view within spherical image 10. In some embodiments, a user maintains device 20 substantially still along axis 206 and rotates device 20 about axis 206 during the image acquisition to ensure consistent and symmetrical image acquisition. Accordingly, device 20 can include one or more positioning functions, such as global position satellite capabilities, WiFi triangulation capabilities, and/or mobile telephone triangulation capabilities, in order to assist the user in maintaining device 20 substantially along axis 206 during the acquisition process.

In some embodiments, if the image capture mechanism is still photography, then the acquisition of the at least one image is substantially simultaneous with a user input, such as a tactile input or audio command. Alternatively, if the image capture mechanism is video photography, then the acquisition of the at least one image can continue for a duration following the user input. In another alternative, the acquisition of the at least one image can be initiated in response to a predetermined orientation/location condition of the image capture device, such that if the user positions/moves the image capture device in a predetermined fashion, the image capture device will automatically acquire the image. In another alternative, the image capture mechanism can include both still photography and video photography portions, in which case the image acquisition process can respond as necessitated by the requirements of the image capture device. Another variation of the method of an embodiment can include acquiring a second image that substantially replicates a prior acquired image. In some embodiments, the second image acquisition can be performed in response to determining a low quality in the prior acquired image. Image quality can be determined at the image capture device, or alternatively at a remote database or server during a subsequent image processing phase.

In some embodiments, as discrete images/frames 200, 200A, 200B are captured, the user can be provided with feedback to ensure a complete acquisition of the VAR scene. For example, instructions can be provided with the spatial or temporal patterns described above to guide, teach, instruct, and/or cause a user to acquire any subsequent images in accordance with the predetermined pattern so as to ensure completion of the complete VAR scene. In some embodiments, the feedback can include at least one of user-oriented feedback or device-oriented feedback. User-oriented feedback can include for example visual, tactile, or audio feedback to communicate corrective suggestions to the user during the image acquisition sequence. As an example, user-oriented feedback can include distorting a display and/or audio feed during motion of the device such that a user is prompted to wait until there is a clear image, written instruction, sound, and/or the like prior to capturing the intended image/frame. In some embodiments, acceleration of the device can be determined by any suitable sensor, such as the one or more cameras (front/rear), an accelerometer, a gyroscope, a MEMS gyroscope, a magnetometer, a pedometer, a proximity sensor, an infrared sensor, an ultrasound sensor. In response to a device acceleration/motion, the device can provide user-oriented feedback to the user in order to get the user to manage the device motion and improve the capture of the VAR scene.

In some embodiments, device-oriented feedback can include for example automated control of the timing, sequencing, and selection of captured still images/video frames based on one or more predetermined factors. In some embodiments, both user-oriented and device-oriented feedback is provided to the user. Alternatively, the device-oriented feedback can be directed to the image capture device with or without the user's knowledge. In some embodiments, the user-oriented feedback can be combined with one or more aspects of the predetermined pattern to provide the user with a continuous input-feedback loop relating to the acquisition of the VAR scene such that the user does not stray or (per the device's action) is unable to stray from the predetermined pattern.

As noted above, the image capture device can include one or more cameras (front/rear), an accelerometer, a gyroscope, a MEMS gyroscope, a magnetometer, a pedometer, a proximity sensor, an infrared sensor, an ultrasound sensor—all or any of which can be used to determine an acceleration/motion of the image capture device through the predetermined pattern. Device-oriented feedback can be initiated in response to a sensor determination and/or a context of the predetermined pattern (i.e., whether a sudden acceleration of the device proper at a particular point in the acquisition process.) In some embodiments, the method of an embodiment provides device-oriented feedback in response to an improper/non-ideal handling of the image capture device for a predetermined portion (context) of the predetermined pattern. Device-oriented feedback can automate the selection of video frames and/or the actuation of capturing still images, in response to one or more predetermined conditions relating to the motion of the image capture device and/or the context of the predetermined pattern.

As an example, device-oriented feedback can control the selection of video frames and/or the actuation of capturing still images in response to one or more of: an angular/linear distance between the present location of the image capture device and the last captured/selected image/frame; an angular/linear distance between the present location of the image capture device and any other arbitrary previously captured/selected image/frame in the predetermined pattern; a time since the last captured/selected image/frame; an exposure difference measured from the last captured/selected image/frame; a current exposure level; an angular velocity of the image capture device; a shutter speed of the one or more cameras of the image capture device; a camera gain; a distance to any discrete guide point and/or guide region in the predetermined pattern and/or location of interest; a product of the angular velocity of the image capture device (average/current) and the shutter speed of the one or more cameras of the image capture device; and/or any explicit instruction from the user indicating a relative importance of the frame/image currently capturable by the image capture device. Alternatively, the device-oriented feedback can include any other usable measurements of the image capture device orientation and/or location, or any other suitable parameter relating to qualitative and/or quantitative aspects of the image sought.

Figure 6:
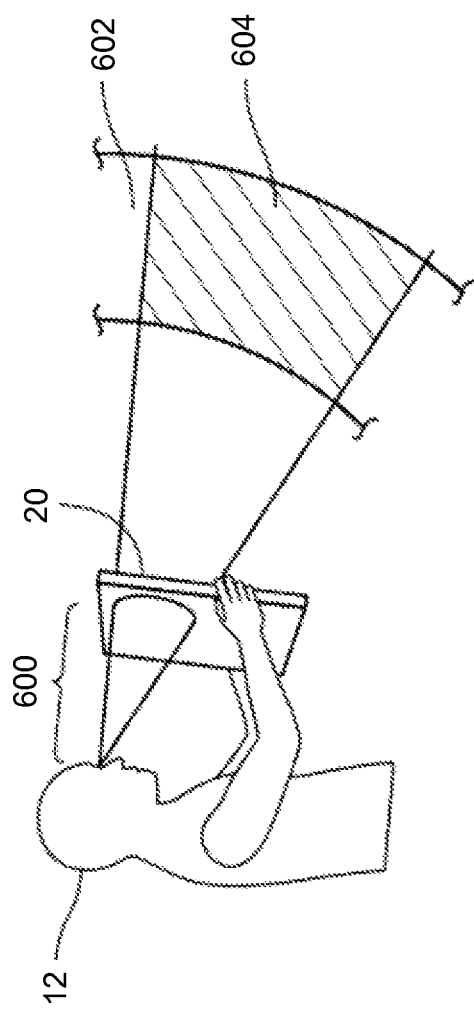
FIG. 6 shows an example of viewing a VAR scene, in accordance with an embodiment of the present invention.

FIG. 6 shows an example of viewing a VAR scene, in accordance with an embodiment of the present invention. As shown in FIG. 6, in some embodiments device 20 can be used to view a VAR scene, such as spherical image 602. In some embodiments, the portion of the spherical image (e.g., VAR scene 604) that is displayable by device 20 corresponds to an overlap between a viewing frustum of the device (e.g., a viewing cone projected from device 20) and spherical image 602. VAR scene 604 can be a portion of spherical image 602, which can include a substantially rectangular display of a concave, convex, or hyperbolic rectangular portion of the sphere of spherical image 602. In some embodiments, nodal point 12 is disposed at a distance 600 approximately the origin of the spherical image 602, such that a viewer located at nodal point 12 has the illusion of being located at the center of a larger sphere or bubble having VAR scene 604 displayed on its interior. Alternatively, nodal point 12 can be disposed at any other suitable vantage point within spherical image 602 displayable by device 20. In another alternative, the displayable scene can include a substantially planar and/or ribbon-like geometry from which the nodal point is distanced in a constant or variable fashion. In some embodiments, the display of VAR scene 604 can be performed within a 3D or 2D graphics platform such as OpenGL, WebGL, or Direct 3D. Alternatively, the display of scene 604 can be performed within a browser environment using one or more of HTML5, CSS3, or any other suitable markup language. In another variation of the device 20 of an embodiment, the geometry of the displayable scene can be altered and/or varied in response to an automated input and/or in response to a user input.

In some embodiments, as described further below, device 20 can include processor 70 which can be configured to adapt VAR scene 604 displayable on the device 20 to the user in response to a change in the orientation of device 20 and/or the orientation of nodal point 12 relative to device 20. Processor 70 can function to alter, change, reconfigure, recompute, regenerate, and/or adapt the displayable scene in response to a change in the orientation of device 20 and/or the orientation of nodal point 12 relative to device 20 to create a uniform and immersive user experience by adapting the displayable scene consistent with movement of device 20 relative to the projection matrix and/or relative to nodal point 12. In some embodiments, adapting the displayable scene can include at least one of processor 70 adjusting a virtual zoom of the scene, processor 70 adjusting a virtual parallax of the scene, processor 70 adjusting a virtual perspective of the scene, and/or processor 70 adjusting a virtual origin of the scene. Alternatively, or additionally, adapting the displayable scene can include any suitable combination of the foregoing, performed by processor 70 of an embodiment substantially serially or substantially simultaneously, in response to a timing of any determined change in the orientation of device 20 and/or the orientation of nodal point 12 relative to device 20.

Figure 7:
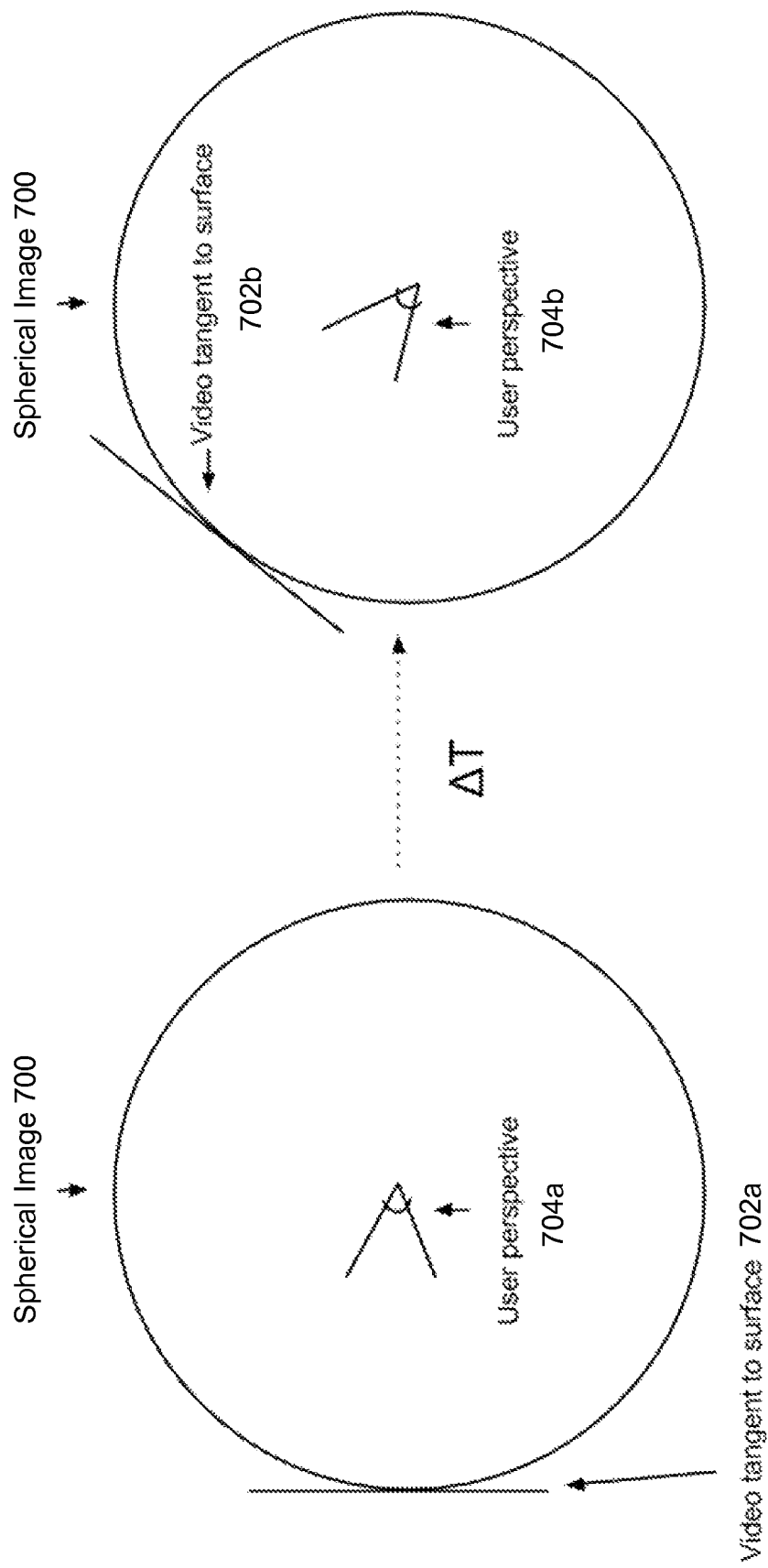
FIG. 7 shows an example of combining a dynamic portion of a VAR scene with a static portion of a VAR scene, in accordance with an embodiment of the present invention.

FIG. 7 shows an example of combining a dynamic portion of a VAR scene with a static portion of a VAR scene, in accordance with an embodiment of the present invention. As described above, device 20 can capture, generate, and/or share VAR scenes. These VAR scenes generally include a plurality of static images that are combined to form a VAR scene, such as spherical image 700. This can produce an immersive, yet static, view of the VAR scene which lacks dynamic content (e.g., content which varies over time). Embodiments of the present invention can efficiently add dynamic content to the VAR scene, allowing VAR scenes including dynamic content to be uploaded, shared, or otherwise transmitted without prohibitive resource requirements. Dynamic content can be captured by device 20 and, as described further below, combined with a preexisting or simultaneously captured VAR scene.

In some embodiments, the dynamic content captured by the device can be combined with spherical image 700 as video content 702a which is incorporated with spherical image 700 such that video content 702a is tangent to spherical image 700 as a "highlight". A highlight can be any content that varies over the time domain and which represents a subset of the VAR scene (e.g., spherical image 700). This can include a video that may or may not include depth information that can be layered on top of a 3D model or in perpendicular to the user's rays of projection to provide a "billboarding" effect which is one of a seamless experience without distortion in the context of a VAR scene represented by a spherical photograph. Any suitable content that varies over time and/or spatial domains can be used.

As shown in FIG. 7, the dynamic content can include a plurality of frames which can be combined at multiple locations tangent to spherical image 700. Thus, the highlight may move around spherical image 700, while staying perpendicular to the perspective of the user 704*a*, 704*b* over time (e.g., the surface normal is aligned with the center of the projection) such that the motion, if isolated within the frame, is perceived as a seamless motion inside the spherical image 700.

Figure 8:
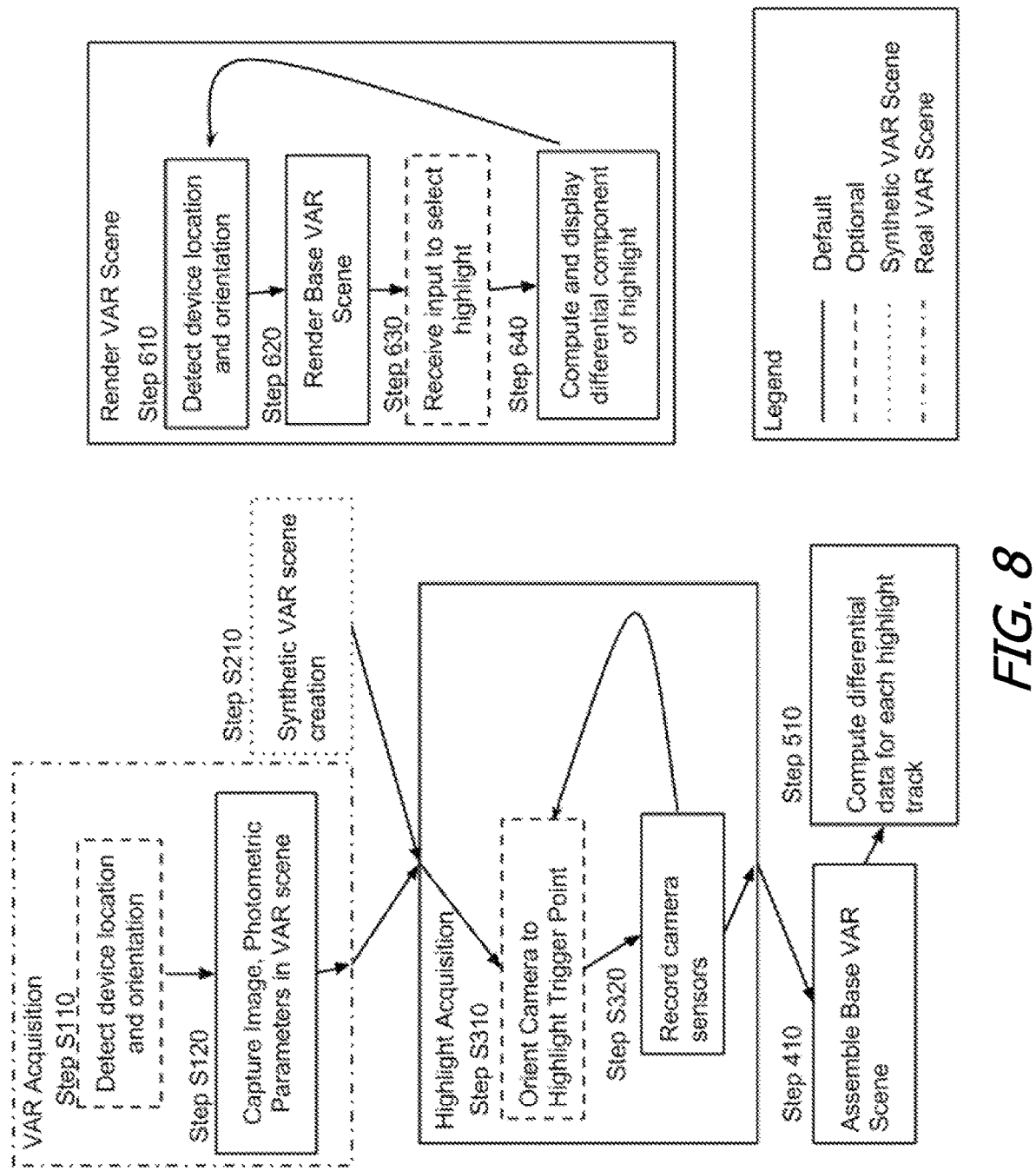
FIG. 8 is a flow diagram of a process of displaying partial motion in virtual and augmented reality scenes, in accordance with an embodiment of the invention.

FIG. 8 is a flow diagram of a process of displaying partial motion in virtual and augmented reality scenes, in accordance with an embodiment of the invention. As shown in FIG. 8, at block S110 the method of an embodiment includes first determining the device location and orientation of the device according to a chosen reference frame, at block S120 next capturing image (optical, depth or other features), photometric parameters and location of the VAR scene, or at block S210 optionally creating of a synthetic VAR scene.

Next, in some embodiments, at block S310 the method includes steps to acquire highlighted, or partial, components of the VAR scene in a dynamic (changing through time) dimension, beginning with optionally orienting the camera or device to highlight the trigger point for consumption or playback and then, at block S320, recording camera sensors through time until the user has completed acquisition of the highlight (e.g., the dynamic portions) of the VAR scene, or is ready to add an additional highlight.

In some embodiments, at block 410 the method includes steps to assemble the base VAR scene depending on the acquired inputs and types of data and then, at block 510, computing differential data for each highlight track through time so such that playback when paused results in a coherent static VAR scene.

In some embodiments, once the VAR scene has been captured and the highlight has been acquired, the display of the VAR scene can include detecting the device location and orientation through an IMU, camera, or other sensor (block S610), computing a consistent reconstruction of the VAR scene given the location and orientation of the VAR scene (block S620), starting or pausing the playback of a highlight based on user input or a trigger based on the user's orientation or location within the VAR scene (block S630), and then finally computing and displaying the differential component of the highlight relative to the rest of the VAR scene (block S640).

In some embodiments, the virtual and augmented reality scene may include of a 3D model, a partially or wholly spherical photo, digitally generated environment map, and/or other suitable model presentable in 3D space.

In some embodiments, an image can be approximated as being the result of a function which takes in intrinsic properties of a scene—such as, but not limited to, the objects in the scene, their reflectivity and radiosity, atmospheric effects, etc.—and combines them with photometric parameters such as, but not limited to, exposure, white balance, etc. to produce a resulting image. This image can be defined in terms of optical properties, depth, or any other suitable measurable quantity that varies across a scene.

In some embodiments, a highlight can be approximated as content that varies over the time domain and represents a subset of the VAR scene. This can include a video that may or may not contain depth information that can be layered on top of a 3D model or in perpendicular to the user's rays of projection to provide a "billboarding" effect which is one of a seamless experience without distortion in the context of a VAR scene represented by a spherical photograph. Any suitable content that varies over time and spatial domains is appropriate.

As shown in FIG. 8, block S110, which includes detecting orientation of a computing device functions to determine the orientation of the computing device. The computing device can include an inertial measurement unit (IMU) that can include a 3-axis magnetometer, a 3-axis accelerometer, or a 3-axis gyroscope. The IMU may alternatively include any suitable combination of the above components or a single or double axis sensor or any suitable sensor combination to detect orientation. Additionally, block S110 may include detecting positioning location, which can provide another parameter for determining orientation and position. A global positioning system (GPS) can be used to determine geographical location. Orientation information may be gathered in any suitable manner including device API's or through any suitable API exposing device orientation information such as using HTML5 to access device orientation or CoreMotion on an iOS platform or the equivalent on Android and Windows platforms. An imaging system may additionally be used to perform image processing on the surrounding environment. In some embodiments the image system is a forward or backward facing camera that can be used to determine the position of a user looking at the computing device. In the case where there are no suitable sensors, this step may represent the device orientation as the identity orientation.

Block S120 can include capturing a VAR scene using a combination of different sensor inputs required to construct a VAR scene. These may be a combination of orientation and image pairs used to construct a spherical or panoramic photograph or a combination of images, IMU readings and depth readings to construct a 3D model. Any suitable representation that produces a navigable VAR scene is appropriate.

Block S210 can include artificially constructing a VAR scene that can be augmented by a set of captured highlights. These may be either a spherical photograph, 3D model, or any other suitable data representation of a VAR scene.

Block S310 can include specifying a point in which the VAR scene at which point the user consuming the final composite would like to view the given highlight. This can be either the starting orientation and location when the user begins recording a highlight or a point at which the user marks during the capture of the highlight.

Block S320 can include recording the camera sensors and store them along the time domain. In some embodiments, this includes any standard video format (such as, but not limited to, h264, AVI, MPEG) combined with metadata representing the orientation and optionally translation in a scene.

Block 410 can include assembling the captured VAR scene into a static base VAR scene that can be augmented with the dynamic highlights. In some embodiments, this includes combining images and orientations into a spherical photograph. In another implementation, this may include combining images, orientations, translations and depth readings into a 3D model. Additionally, one may combine the data captured in S120, S210 and S320 to create a static VAR scene that when viewed with the highlights provides a seamless start and stop transition at the beginning and end of the playback. As an example, if a highlight is focusing on someone talking at a dinner table, the static VAR scene may be a frame chosen such that the start frame of a highlight is used at the base location in a static VAR scene so that there is no visual "skipping" during highlight playback. Any suitable implementation that constructs a static VAR scene is permissible.

Block S510 can include computing differential temporal data for each highlight track. In some embodiments, for a VAR scene represented as a spherical panorama, this may include aligning each individual frame from a video highlight along the base VAR scene. This may be done using interest point matching, combined with RANSAC or any suitable means to approximate the location of the objects in the camera so that the highlight and the VAR scene appear as one coherent scene at any given point in time. In some embodiments, this may include a direct placement of the rectangle of the video in over the portion of the VAR scene it applied to. Another may provide a Gaussian mask to help blend the two components together into a coherent scene. Another method may use a more sophisticated form of blending such as poison blending or seaming such as a suitable graph-cut method. Any suitable means of interpolating the highlight data into the VAR scene is permissible.

Block S610 can be substantially equivalent to S110 in detecting the device location and orientation. This can optionally include specifying a synthetic location and orientation or offset such that the user is not required to use their motion to explore the VAR scene.

Block S620 can include displaying a VAR scene according to the desired parameters. In some embodiments, this includes a stereo pair of spherical photos that are rendered for each eye on a device. Any suitable representation is appropriate.

Block S630 can include beginning playback of a highlight based on the sensor and/or location inputs from S610. In some embodiments, this may include, but is not limited to, beginning playback when the center vector of the projection intersects with the video frame of the first frame of a highlight. In another implementation, this is a button in the user interface that begins and/or controls playback.

Block S640 can include playing back the pre-computed differential data in S510 in the VAR scene. In some embodiments, this may include, but is not limited to, a video combined with temporal orientation and location used to transform the playback rectangle combined with an alpha mask defined in an additional track, channel, or any other suitable format so that at any point in time the highlight appears a coherent part of the VAR scene. In the aforementioned implementation wherein the VAR scene is represented by a spherical photo, because the surface normals of the imagery are aligned with the center projection vector of the viewer, if there is no perceptible border between the VAR scene and the highlight the composite will be geometrically consistent. In some scenarios, it may make sense to temporarily adapt the VAR scene to be consistent with the highlight, for example poisson blending is often done from both sides of an image border. Any suitable playback method, for example involving a video with a 3D depth map, a stereo pair, or a fully defined animation is appropriate when combined with the base static VAR scene.

As discussed further below with respect to FIG. 10, the (capture and/or viewer mobile) device 20 of an embodiment can include a display 22, an orientation module 50 including a real orientation module and a user orientation module, a location module 60, a camera 90 oriented in substantially the same direction as the display 22, and a processor 70 connected to each of the display, orientation module 50, location module 60, and camera 90. The device 14 of an embodiment can function to capture and/or present a virtual and/or augmented reality (VAR) scene to a user from the point of view of a nodal point or center thereof, such that it appears to the user that he or she is viewing the world (represented by the VAR scene) through a frame of a window. The device 20 of an embodiment can include any suitable type of mobile computing apparatus such as a smart phone, a personal computer, a laptop computer, a tablet computer, a television/ monitor paired with a separate handheld orientation/location apparatus, or any suitable combination thereof.

Figure 9:
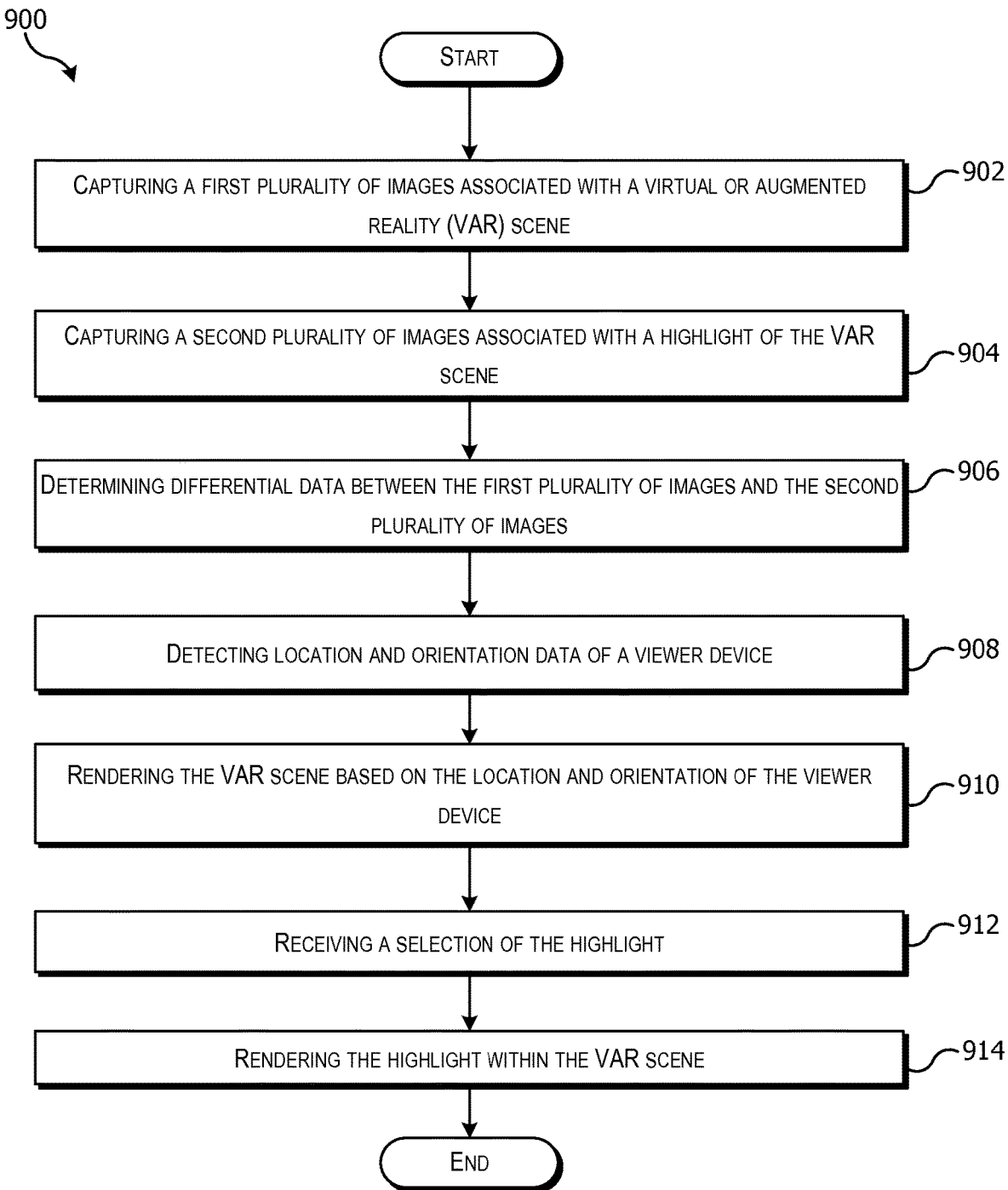
FIG. 9 is a flow diagram of a process of displaying partial motion in virtual and augmented reality scenes, in accordance with an embodiment of the present invention.

FIG. 9 is a flow diagram of a process 900 for managing calendar invites according to an embodiment of the present invention. Process 900 can be performed by an online content management service, capture device or viewer device, as described above.

At block 902, a first plurality of images associated with a virtual or augmented reality (VAR) scene can be captured. As described above, device 20 can capture the first plurality of images using a camera, video camera, or other component. In some embodiments, device 20 can display a spatial pattern to guide the user while capturing the first plurality of images. In some embodiments, capturing the first plurality of images can include detecting location and orientation data of a capture device, and associating each image of the first plurality of images with the location and orientation data detected when that image is captured. The orientation data may be used to combine the first plurality of images into the VAR scene.

At block 904, a second plurality of images associated with a highlight of the VAR scene can be captured. In some embodiments, the capturing the second plurality of images can include receiving a selection to capture the second plurality of images with the device in a starting location and orientation. During capture, location and orientation data of a capture device can be detected and associated the location and orientation data of the capture device over time during capture of the second plurality of images.

At block 906, differential data between the first plurality of images and the second plurality of images can be determined. In some embodiments, as described above determining differential data can include aligning each individual frame from a video highlight along the base VAR scene using, e.g., interest point matching, combined with RANSAC or any suitable means to approximate the location of the objects in the camera so that the highlight and the VAR scene appear as one coherent scene at any given point in time.

At block 908, location and orientation data of a viewer device can be detected. Location and orientation data can be determined using an accelerometer, a gyroscope, a MEMS gyroscope, a magnetometer, a pedometer, a proximity sensor, an infrared sensor, an ultrasound sensor, a global position satellite transceiver, WiFi transceiver, mobile telephone components, and/or any combination thereof.

At block 910, the VAR scene can be rendered based on the location and orientation of the viewer device. In some embodiments, rendering the VAR scene can include assembling the first plurality of images into a spherical VAR scene based on the detected location and orientation data associated with each image of the first plurality of images, and overlaying at least one image from the second plurality of images on the spherical VAR scene based on the location and orientation data associated with the at least one image from the second plurality of images. In some embodiments, overlaying at least one image from the second plurality of images on the spherical VAR scene can include blending the at least one image from the second plurality of images with the spherical VAR scene.

At block 912, a selection of the highlight can be received at the viewer device. At block 914, the selected highlight can be rendered within the VAR scene using the differential data. In some embodiments, the VAR scene comprises a static base VAR scene and the highlight of the VAR scene which represents a portion of the VAR scene and varies with time.

In some embodiments, blending can include one or more of direct placement, blending using a Gaussian mask, poisson blending, and seaming.

It will be appreciated that process 900 is illustrative and that variations and modifications are possible. Steps described as sequential can be executed in parallel, order of steps can be varied, and steps can be modified, combined, added or omitted. The processes can be performed by various computer systems, including a client computer system (e.g., a capture device or a viewer device), and/or a server computer system of an online content management service. In some embodiments, different portions of the processes can be performed by different computer systems.

While the invention has been described with respect to specific embodiments, one skilled in the art will recognize that numerous modifications are possible. For example, while the description above can make reference to email, the invention can be applied to any type of electronic message that can be stored and managed.

Figure 10:
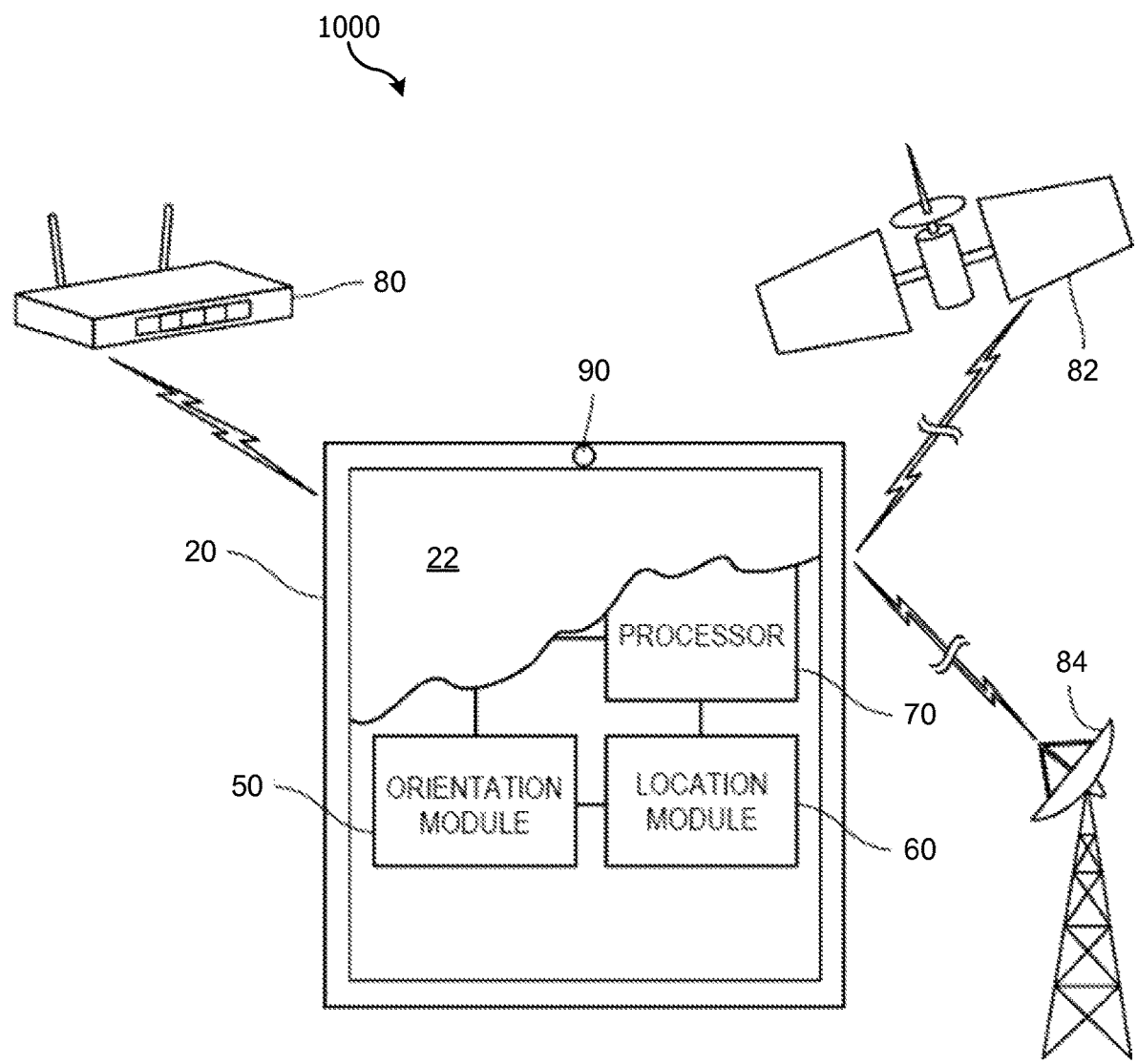
FIG. 10 shows a simplified block diagram of a representative computer system that can be used in an embodiment of the present invention.

FIG. 10 shows a simplified block diagram of a representative computer system 1000 that can be used in an embodiment of the present invention. As shown in FIG. 10, orientation module 50 of device 20 of an embodiment includes at least a real orientation portion and a user orientation portion. The real orientation portion of orientation module 50 provides a frame of reference for device 20 as it relates to a world around it, wherein the world around can include real three dimensional space, a virtual reality space, an augmented reality space, or any suitable combination thereof. As noted below, the projection matrix can include a mathematical representation of an arbitrary orientation of a three-dimensional object (i.e., device 20) having three degrees of freedom relative to a second frame of reference. As noted in the examples below, the projection matrix can include a mathematical representation of device 20 orientations in terms of its Euler angles (pitch, roll, yaw) in any suitable coordinate system.

In one variation of device 20 of an embodiment, the second frame of reference can include a three-dimensional external frame of reference (i.e., real space) in which the gravitational force defines baseline directionality for the relevant coordinate system against which the absolute orientation of device 20 can be measured. In such an example implementation, device 20 will have certain orientations corresponding to real world orientations, such as up and down, and further such that device 20 can be rolled, pitched, and/or yawed within the external frame of reference. In some embodiments, orientation module 50 can include a MEMS gyroscope configured to calculate and/or determine a projection matrix indicative of the orientation of device 20. In one example configuration, the MEMS gyroscope can be integral with orientation module 50. Alternatively, the MEMS gyroscope can be integrated into any other suitable portion of device 20 or maintained as a discrete module of its own.

As shown in FIG. 10, the user orientation portion of orientation module 50 can function to provide a frame of reference for device 20 relative to a point or object in space, including a point or object in real space. In some embodiments, the user orientation can include a measurement of a distance and/or rotational value/s of the device relative to a nodal point. In another variation of device 20 of an embodiment, the nodal point can include a user's head such that the user orientation includes a measurement of the relative distance and/or rotational value/s of device 20 relative to a user's field of view. Alternatively, the nodal point can include a portion of the user's head, such as for example a point between the user's eyes. In another alternative, the nodal point can include any other suitable point in space, including for example any arbitrary point such as an inanimate object, a group of users, a landmark, a location, a waypoint, a predetermined coordinate, and the like. As shown above in FIG. 10, in some embodiments the user orientation portion of orientation module 50 can function to create a viewing relationship between a viewer (optionally located at nodal point 12) and device 20, such that a change in user orientation can cause a consummate change in viewable content consistent with the user's VAR interaction, i.e., such that the user's view through the frame will be adjusted consistent with the user's orientation relative to the frame.

As shown in FIG. 10, one variation of device 20 of an embodiment includes location module 60 connected to processor 70 and orientation module 50. Location module 60 of an embodiment functions to determine a location of device 20. As noted above, location can refer to a geographic location, which can be indoors, outdoors, above ground, below ground, in the air or on board an aircraft or other vehicle. In some embodiments, as shown in FIG. 10, device 20 of an embodiment can be connectable, either through wired or wireless means, to one or more of satellite positioning system 82, a local area network or wide area network such as WiFi network 80, and/or cellular communication network 84. A suitable satellite position system 82 can include for example the Global Positioning System (GPS) constellation of satellites, Galileo, GLONASS, or any other suitable territorial or national satellite positioning system. In one alternative embodiment, location module 60 of an embodiment can include a GPS transceiver, although any other type of transceiver for satellite-based location services can be employed in lieu of or in addition to a GPS transceiver.

Processor 70 of device 20 of an embodiment functions to manage the presentation of the VAR scene to the viewer. In some embodiments, processor 70 can function to display a scene to the viewer 12 on display 22 in response to the real orientation and the user orientation. Processor 70 of an embodiment can be configured to process, compute, calculate, determine, and/or create a VAR scene that can be displayed on device 20 to a viewer, wherein the VAR scene is oriented to mimic the effect of the viewer viewing the VAR scene as if through the frame of the device 20. In some embodiments, orienting the scene can include preparing a VAR scene for display such that the viewable scene matches what the user would view in a real three-dimensional view, that is, such that the displayable scene provides a simulation of real viewable space to the viewer as if device 20 were a transparent frame. As noted above, the scene is can be a VAR scene; therefore it can include one or more virtual and/or augmented reality elements composing, in addition to, and/ or in lieu of one or more real elements (buildings, roads, landmarks, and the like, either real or fictitious). Alternatively, the scene can include processed or unprocessed images/videos/multimedia files of one or more displayable scene aspects, including both actual and fictitious elements as noted above.

It will be appreciated that computer system 1000 is illustrative and that variations and modifications are possible. Computer system 1000 can have other capabilities not specifically described here (e.g., mobile phone, global positioning system (GPS), power management, one or more cameras, various connection ports for connecting external devices or accessories, etc.). Further, while computer system 1000 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

What is claimed is:

1. A method comprising:
   displaying a virtual or augmented reality (VAR) scene comprising a first plurality of images;
   detecting an orientation of a viewer device with respect to the VAR scene;
   displaying a first portion of the VAR scene comprising an object and a marker for a location of the object within the VAR scene;
   detecting a selection of the marker at the location of the object within the VAR scene; and
   based on the detected orientation of the viewer device with respect to the VAR scene and the detected selection of the marker, displaying a second portion of the VAR scene comprising dynamic content from a second plurality of images.

2. The method of claim 1, further comprising:
   displaying an initial view of the first portion of the VAR scene based on the orientation of the viewer device;
   detecting a changed orientation of the viewer device; and
   displaying a subsequent view of the first portion of the VAR scene based on the changed orientation of the viewer device.

3. The method of claim 1, wherein detecting the selection of the marker at the location of the object within the VAR scene comprises detecting a vector intersecting the marker at the location of the object within the VAR scene.

4. The method of claim 1, wherein displaying the second portion of the VAR scene comprising the dynamic content comprises displaying a video comprising the second plurality of images.

5. The method of claim 1, wherein detecting the selection of the marker at the location of the object within the VAR scene comprises detecting, by the viewer device, a user selection of a highlight for the location of the object within the VAR scene.

6. The method of claim 1, wherein the first portion of the VAR scene comprises a static base VAR scene, the object overlapping a view of a second object and the marker for the location of the object within the first portion of the VAR scene.

7. The method of claim 1, wherein:
   displaying the first portion of the VAR scene comprises displaying a spherical composite image that assembles the first plurality of images; and
   displaying the second portion of the VAR scene comprises displaying one or more of the second plurality of images corresponding to a tangential point along a periphery of the spherical composite image.

8. The method of claim 1, further comprising:
   displaying the first portion of the VAR scene comprising the object and a dynamic marker for the location of the object within the VAR scene, wherein images representing the dynamic marker change over time;
   detecting a selection of the dynamic marker at the location of the object within the VAR scene; and
   based on detecting the selection of the dynamic marker, displaying the second portion of the VAR scene comprising dynamic content from the second plurality of images.

9. A system comprising:
   at least one processor; and
   at least one non-transitory computer readable storage medium storing instructions that, when executed by the at least one processor, cause the system to:
      display a virtual or augmented reality (VAR) scene comprising a first plurality of images;
      detecting an orientation of a viewer device with respect to the VAR scene;
      display a first portion of the VAR scene comprising an object and a marker for a location of the object within the VAR scene;
      detect a selection of the marker at the location of the object within the VAR scene; and
      based on the detected orientation of the viewer device with respect to the VAR scene and the detected selection of the marker, display a second portion of the VAR scene comprising dynamic content from a second plurality of images.

10. The system of claim 9, further comprising instructions that, when executed by the at least one processor, cause the system to:
    display an initial view of the first portion of the VAR scene based on the orientation of a viewer device;
    detect a changed orientation of the viewer device; and
    display a subsequent view of the first portion of the VAR scene based on the changed orientation of the viewer device.

11. The system of claim 9, further comprising instructions that, when executed by the at least one processor, cause the system to display the second portion of the VAR scene comprising the dynamic content by displaying a video comprising the second plurality of images.

12. The system of claim 9, further comprising instructions that, when executed by the at least one processor, cause the system to detect the selection of the marker at the location of the object within the VAR scene by detecting a user selection of a highlight for the location of the object within the VAR scene.

13. The system of claim 9, further comprising instructions that, when executed by the at least one processor, cause the system to:
   display the first portion of the VAR scene by displaying a spherical composite image that assembles the first plurality of images; and
   display the second portion of the VAR scene by displaying one or more of the second plurality of images corresponding to a tangential point along a periphery of the spherical composite image.

14. The system of claim 9, further comprising instructions that, when executed by the at least one processor, cause the system to:
   display the first portion of the VAR scene comprising the object and a dynamic marker for the location of the object within the VAR scene, wherein images representing the dynamic marker change over time;
   detect a selection of the dynamic marker at the location of the object within the VAR scene; and
   based on detecting the selection of the dynamic marker, display the second portion of the VAR scene comprising dynamic content from the second plurality of images.

15. A non-transitory computer readable storage medium storing instructions thereon that, when executed by at least one processor, cause a computing device to:
   display a virtual or augmented reality (VAR) scene comprising a first plurality of images;
   detect an orientation of the computing device with respect to the VAR scene;
   display a first portion of the VAR scene comprising an object and a marker for a location of the object within the VAR scene;
   detect a selection of the marker at the location of the object within the VAR scene; and
   based on the detected orientation of the computing device with respect to the VAR scene and the detected selection of the marker, display a second portion of the VAR scene comprising dynamic content from a second plurality of images.

16. The non-transitory computer readable storage medium of claim 15, further comprising instructions that, when executed by the at least one processor, cause the computing device to:
   display an initial view of the first portion of the VAR scene based on the orientation of the computing device;
   detect a changed orientation of the computing device; and
   display a subsequent view of the first portion of the VAR scene based on the changed orientation of the computing device.

17. The non-transitory computer readable storage medium of claim 15, further comprising instructions that, when executed by the at least one processor, cause the computing device to display the second portion of the VAR scene comprising the dynamic content by displaying a video comprising the second plurality of images.

18. The non-transitory computer readable storage medium of claim 15, further comprising instructions that, when executed by the at least one processor, cause the computing device to detect the selection of the marker at the location of the object within the VAR scene by detecting a user selection of a highlight for the location of the object within the VAR scene.

19. The non-transitory computer readable storage medium of claim 15, further comprising instructions that, when executed by the at least one processor, cause the computing device to:
   display the first portion of the VAR scene by displaying a spherical composite image that assembles the first plurality of images; and
   display the second portion of the VAR scene by displaying one or more of the second plurality of images corresponding to a tangential point along a periphery of the spherical composite image.

20. The non-transitory computer readable storage medium of claim 15, further comprising instructions that, when executed by the at least one processor, cause the computing device to:
   display the first portion of the VAR scene comprising the object and a dynamic marker for the location of the object within the VAR scene, wherein images representing the dynamic marker change over time;
   detect a selection of the dynamic marker at the location of the object within the VAR scene; and
   based on detecting the selection of the dynamic marker, display the second portion of the VAR scene comprising dynamic content from the second plurality of images.

* * * * *